(12) United States Patent
Nakayama

(10) Patent No.: US 11,613,105 B2
(45) Date of Patent: Mar. 28, 2023

(54) INTERLAYER FOR LAMINATED GLASS, METHOD FOR PRODUCING INTERLAYER FOR LAMINATED GLASS, AND LAMINATED GLASS

(71) Applicant: SEKISUI CHEMICAL CO., LTD., Osaka (JP)

(72) Inventor: Kazuhiko Nakayama, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 420 days.

(21) Appl. No.: 16/475,494

(22) PCT Filed: Mar. 28, 2018

(86) PCT No.: PCT/JP2018/012762
§ 371 (c)(1),
(2) Date: Jul. 2, 2019

(87) PCT Pub. No.: WO2018/181474
PCT Pub. Date: Oct. 4, 2018

(65) Prior Publication Data
US 2019/0375197 A1    Dec. 12, 2019

(30) Foreign Application Priority Data
Mar. 31, 2017  (JP) .............................. JP2017-072767

(51) Int. Cl.
*B32B 17/10* (2006.01)
*B60J 1/00* (2006.01)

(52) U.S. Cl.
CPC .. *B32B 17/10587* (2013.01); *B32B 17/10036* (2013.01); *B32B 17/10761* (2013.01);
(Continued)

(58) Field of Classification Search
CPC ............... B32B 17/10036; B60J 1/001; G02B 27/0101
See application file for complete search history.

(56) References Cited

U.S. PATENT DOCUMENTS

2007/0148472 A1* 6/2007 Masaki ............. B32B 17/10981
428/426
2016/0151995 A1* 6/2016 Kitano .............. B32B 17/10587
428/186
(Continued)

FOREIGN PATENT DOCUMENTS

JP    2001-048599    2/2001
JP    2001-261385    9/2001
(Continued)

OTHER PUBLICATIONS

English translation of JP 2001-261385A (Year: 2001).*
(Continued)

*Primary Examiner* — Jasper Saberi
(74) *Attorney, Agent, or Firm* — Wenderoth, Lind & Ponack, L.L.P.

(57) ABSTRACT

The present invention aims to provide an interlayer film for a laminated glass that enables production of a laminated glass having high visible light transmittance even when deaeration for preliminary pressure bonding and heating for final pressure bonding are performed in parallel in a vacuum deaeration method. The present invention also aims to provide a method for producing the interlayer film for a laminated glass, and a laminated glass including the interlayer film for a laminated glass. Provided is an interlayer film for a laminated glass having a multitude of recesses on at least one surface, the surface with the recesses having a texture aspect ratio Str of 0.04 or lower as measured in conformity with ISO 25178.

6 Claims, 2 Drawing Sheets

(52) U.S. Cl.
CPC ......... *B32B 17/10871* (2013.01); *B60J 1/001* (2013.01); *B32B 2250/02* (2013.01); *B32B 2255/26* (2013.01); *B32B 2307/412* (2013.01); *B32B 2307/538* (2013.01)

(56) References Cited

U.S. PATENT DOCUMENTS

| | | |
|---|---|---|
| 2016/0318278 A1 | 11/2016 | Nakayama et al. |
| 2017/0008257 A1 | 1/2017 | Nakayama et al. |
| 2018/0022058 A1 | 1/2018 | Nakayama et al. |
| 2018/0037008 A1 | 2/2018 | Nakayama |
| 2018/0050519 A1* | 2/2018 | Nakayama ........ B32B 17/10587 |

FOREIGN PATENT DOCUMENTS

| | | | |
|---|---|---|---|
| JP | 2001261385 A * | 9/2001 | ....... B32B 17/10587 |
| JP | 2004-144107 | 5/2004 | |
| WO | 2015/016361 | 2/2015 | |
| WO | WO-2015016361 A1 * | 2/2015 | ........... B32B 27/306 |
| WO | 2015/156364 | 10/2015 | |
| WO | 2015/156365 | 10/2015 | |
| WO | 2016/163512 | 10/2016 | |
| WO | 2016/163519 | 10/2016 | |
| WO | 2016/167287 | 10/2016 | |

OTHER PUBLICATIONS

Extended European Search Report dated Dec. 7, 2020 in counterpart European Patent Application No. 18778155.4.
International SearchReport dated Jul. 3, 2018 in International (PCT) Application No. PCT/JP2018/012762.

* cited by examiner

INTERLAYER FOR LAMINATED GLASS, METHOD FOR PRODUCING INTERLAYER FOR LAMINATED GLASS, AND LAMINATED GLASS

TECHNICAL FIELD

The present invention relates to an interlayer film for a laminated glass that enables production of a laminated glass having high visible light transmittance even when deaeration for preliminary pressure bonding and heating for final pressure bonding are performed in parallel in a vacuum deaeration method. The present invention also relates to a method for producing the interlayer film for a laminated glass and a laminated glass including the interlayer film for a laminated glass.

BACKGROUND ART

A laminated glass including two glass plates integrated through an interlayer film for a laminated glass containing a thermoplastic resin such as plasticized polyvinyl butyral is widely used for automotive windshields and the like.

Such an automotive windshield is, for example, produced by a vacuum deaeration method using a rubber bag. In the vacuum deaeration method, a laminate including an interlayer film for a laminated glass interposed between at least two glass plates is placed in a rubber bag, and vacuum suctioned for removal of air remaining between the glass plates and the interlayer film so as to be preliminarily pressure bonded. Then, the laminate is pressurized with heat, for example, in an autoclave for final pressure bonding to provide a laminated glass.

In such a process for producing a laminated glass by the vacuum deaeration method, deaeration upon stacking a glass plate and an interlayer film for a laminated glass together is important. The interlayer film for a laminated glass therefore commonly has a multitude of recesses formed on at least one surface for the purpose of ensuring the deaeration properties in production of a laminated glass. In particular, when the recesses each have a groove shape with a continuous bottom (shape of an engraved line) and adjacent recesses in the shape of engraved lines are regularly formed in parallel to each other, highly excellent deaeration properties can be exhibited (for example, Patent Literature 1).

However, even with the use of an interlayer film for a laminated glass having such recesses in the shape of engraved lines, the air may not be sufficiently removed, and air bubbles may remain in the resulting laminated glass, reducing the visible light transmittance. Such a reduction in visible light transmittance due to defective deaeration is significant especially when the deaeration for the preliminary pressure bonding and the heating for the final pressure bonding are performed in parallel in the vacuum deaeration method to shorten the process duration.

CITATION LIST

Patent Literature

Patent Literature 1: JP 2001-48599 A

SUMMARY OF INVENTION

Technical Problem

The present invention aims to provide an interlayer film for a laminated glass that enables production of a laminated glass having high visible light transmittance even when deaeration for preliminary pressure bonding and heating for final pressure bonding are performed in parallel in a vacuum deaeration method. The present invention also aims to provide a method for producing the interlayer film for a laminated glass and a laminated glass including the interlayer film for a laminated glass.

Solution to Problem

The present invention relates to an interlayer film for a laminated glass having a multitude of recesses on at least one surface, the surface with the recesses having a texture aspect ratio Str of 0.04 or lower as measured in conformity with ISO 25178.

The present invention is described in detail below.

The present inventors investigated the cause of the reduction in visible light transmittance due to defective deaeration in production of a laminated glass by the vacuum deaeration method. In the vacuum deaeration method, a laminate including an interlayer film for a laminated glass interposed between at least two glass plates is placed in a rubber bag, and vacuum suctioned for removal of air remaining between the glass plates and the interlayer film so as to be preliminarily pressure bonded. The laminate is then pressurized with heat, for example, in an autoclave for final pressure bonding to provide a laminated glass. In the case of performing the deaeration for the preliminary pressure bonding and the heating for the final pressure bonding in parallel to shorten the process duration, the heating crushes the shape of the recesses, causing a phenomenon called "preceding sealing" in which the layers of the laminate are bonded without sufficient deaeration. The present inventors thus found out that this causes insufficient deaeration.

The interlayer film for a laminated glass having recesses in the shape of engraved lines disclosed in Patent Literature 1 allows easy air suctioning in deaeration, making preceding sealing relatively unlikely to occur. In the case of shortening the process duration, however, the interlayer film cannot completely prevent preceding sealing. This is presumably because the recesses in the shape of engraved lines are uneven in their groove depths and shapes, so that the grooves are locally blocked, causing preceding sealing.

The present inventors made further intensive studies to find out that when the surface with the recesses of the interlayer film for a laminated glass has a texture aspect ratio Str lower than or equal to a certain value, the interlayer film can prevent preceding sealing and enables production of a laminated glass having high visible light transmittance even in the case of performing the deaeration for the preliminary pressure bonding and the heating for the final pressure bonding in parallel to shorten the process duration. The present inventors thus completed the present invention.

The interlayer film for a laminated glass of the present invention has a multitude of recesses on at least one surface. This ensures the deaeration properties in production of a laminated glass. The interlayer film for a laminated glass may have the recesses on only one surface, but preferably has the recesses on both surfaces because the deaeration properties are markedly improved.

In the interlayer film for a laminated glass of the present invention, the surface with the recesses has a texture aspect ratio Str (hereinafter also referred to simply as "Str") of 0.04 or lower as measured in conformity with ISO 25178.

The Str is an index of the shape regularity. The Str lies between 0 and 1. A Str closer to 0 indicates a more regular shape, while a Str closer to 1 indicates a more irregular shape. In a conventional interlayer film for a laminated glass having recesses on a surface, the surface with the recesses has a Str of 0.1 or higher.

In the interlayer film for a laminated glass of the present invention, the surface with the recesses has a Str of 0.04 or lower, or in other words, has far more regular recesses than before. As a result, the interlayer film for a laminated glass prevents preceding sealing and enables production of a laminated glass having high visible light transmittance even in the case of performing the deaeration for the preliminary pressure bonding and the heating for the final pressure bonding in parallel to shorten the process duration. This is presumably because with highly regular recesses, the blockage of grooves due to local crushing of the recesses can be prevented. The surface with the recesses preferably has a Str of 0.03 or lower, more preferably 0.015 or lower.

When the Str is measured to the third decimal place, the number of the third decimal place is taken in consideration to determine if the Str is included in the scope of the present invention. Specifically, in the interlayer film for a laminated glass of the present invention, the Str of the surface with the recesses is 0.040 or lower. For example, a Str of 0.040 is included in the scope of the present invention. A Str of 0.041 is out of the scope of the present invention. The same shall apply when the Str is measured to the fourth decimal place. Specifically, a Str of 0.0400 is included in the scope of the present invention. A Str of 0.0401 is out of the scope of the present invention.

Specifically, the Str can be measured by the following method, for example.

The surface of the interlayer film for a laminated glass is analyzed using a three-dimensional white light interference microscope (e.g., ContourGT-K available from Bruker AXS GmbH) in a 2 mm square field of view at an objective lens magnification of 50 times, an internal lens magnification of 0.5 times, and a resolution set to "half resolution" to obtain images. In this operation, the light quantity and threshold are set as appropriate to minimize noise in the analysis. The obtained images are subjected to planarization and noise removal processes, and noise is further removed using a Gaussian filter. Then, the Str value is calculated by a method specified in ISO 25178.

In the interlayer film for a laminated glass of the present invention, after heating at 100° C. for 15 minutes, the surface with the recesses preferably has a Str of 0.08 or lower. Production of a laminated glass by the vacuum deaeration method includes heating to 90° C. to 100° C. in the final pressure bonding. When the regularity of the recesses is higher than or equal to a certain level even after heating to around 100° C., even better deaeration properties can be exhibited. The surface with the recesses after heating at 100° C. for 15 minutes more preferably has a Str of 0.05 or lower.

In an interlayer film for a laminated glass containing a thermoplastic resin, an increase in the Str of the surface with the recesses due to heating is unavoidable. The increase, however, is preferably as small as possible from the standpoint of ensuring the deaeration properties. In other words, when the increase in the Str value is small even after heating for a certain time, even better deaeration properties can be exhibited. Specifically, the absolute value ΔStr of the difference between the Str values measured before and after heating at 100° C. for 15 minutes is preferably 0.1 or less.

The present invention also encompasses an interlayer film for a laminated glass having a multitude of recesses on at least one surface, the surface with the recesses having a ΔStr of 0.1 or less where the ΔStr is the absolute value of the difference between the texture aspect ratio Str as measured in conformity with ISO 25178 and the texture aspect ratio Str as measured after heating at 100° C. for 15 minutes.

The shape of the recesses is at least a groove shape, and may be any shape commonly employed for recesses formed on the surface of an interlayer film for a laminated glass, such as a shape of engraved lines or a lattice. In particular, preferably, the recesses each have a groove shape with a continuous bottom (shape of an engraved line) (hereinafter such recesses are also referred to as "recesses in the shape of engraved lines") and adjacent recesses are regularly arranged side by side in parallel to each other.

Commonly, easiness of deaeration upon pressure bonding of a laminate including an interlayer film for a laminated glass interposed between two glass plates closely relates to the communication properties and smoothness of the bottoms of the recesses. When the recesses on at least one surface of the interlayer film have the shape of engraved lines and are regularly arranged side by side in parallel to each other, the communication properties of the bottoms are enhanced to remarkably improve the deaeration properties.

The state of "regularly arranged side by side" means both a state where the adjacent recesses in the shape of engraved lines are arranged side by side in parallel to each other at equal intervals and a state where the adjacent recesses in the shape of engraved lines are arranged side by side in parallel to each other but the intervals therebetween are not necessarily equal to each other. FIG. 1 and FIG. 2 are schematic views each illustrating an exemplary interlayer film for a laminated glass in which recesses each having a groove shape are arranged side by side in parallel to each other at equal intervals.

FIG. 3 is a schematic view illustrating an exemplary interlayer film for a laminated glass in which recesses each having a groove shape are arranged side by side in parallel to each other at unequal intervals. In FIG. 3, an interval A between a recess 1 and a recess 2 is different from an interval B between a recess 1 and a recess 3. The recesses in the shape of engraved lines do not necessarily have a groove shape with a completely continuous bottom, and may have a partition wall in a part of the bottom.

The protrusions formed correspondingly to the recesses may have a shape transferred from an embossing roll. The protrusions may each have a flat top as illustrated in FIG. 1 or a non-flat top as illustrated in FIG. 2. In the case where the protrusions each have a flat top, the flat surface of the top may further have fine protrusions and recesses formed thereon. Moreover, the protrusions, among the protrusions and recesses, may have the same height or different heights. The recesses corresponding to these protrusions may have the same depth or different depths as long as the recesses each have a continuous bottom.

The lower limit of the ten-point average roughness (Rz) of the recesses in the shape of engraved lines is preferably 10 μm and the upper limit thereof is preferably 80 μm. When the roughness (Rz) of the recesses in the shape of engraved lines is within the range, excellent deaeration properties can be exhibited. The lower limit of the ten-point average roughness (Rz) of the recesses in the shape of engraved lines is more preferably 20 μm, and the upper limit thereof is more preferably 60 μm. The upper limit is still more preferably 50 μm.

The ten-point average roughness (Rz) of the recesses in the shape of engraved lines as used herein is Rz specified in JIS B 0601(1994), and can be obtained by measurement in a perpendicular direction so as to transverse the direction in which the recesses in the direction of engraved lines are continuous. The measurement device may be, for example, "Surfcorder SE300" available from Kosaka Laboratory Ltd. The measurement may be performed at a cut-off value of 2.5 mm, a standard length of 2.5 mm, a measurement length of 12.5 mm, a spare length of 2.5 mm, and a probe feed rate of 0.5 mm/sec, with a probe having a tip radius of 2 μm and a tip angle of 60°. The measurement is performed at 23° C. and 30 RH %.

The lower limit of the interval Sm between the adjacent recesses in the shape of engraved lines is preferably 100 μm, and the upper limit thereof is preferably 500 μm. When the interval Sm between the recesses in the shape of engraved lines is within the range, excellent deaeration properties can be exhibited. The lower limit of the interval Sm between the recesses in the shape of engraved lines is more preferably 160 μm, and the upper limit thereof is more preferably 350 μm. The upper limit is still more preferably 250 μm.

The interval Sm between the recesses in the shape of engraved lines herein can be obtained by observing first and second surfaces (observation range: 20 mm×20 mm) of the interlayer film for a laminated glass with an optical microscope ("BS-D8000III" available from Sonic Corp.) to measure the intervals between adjacent recesses and calculating the average of the shortest distances between deepest bottoms of the adjacent recesses.

The following describes a specific method for adjusting the Str of the surface with the recesses to 0.04 or lower in the interlayer film for a laminated glass of the present invention, based on an exemplary interlayer film for a laminated glass having the recesses in the shape of engraved lines on at least one surface.

The method for imparting the recesses in the shape of engraved lines to a surface of the interlayer film for a laminated glass usually includes a first step of imparting fine protrusions and recesses to a surface of a resin film and a second step of imparting recesses in the shape of engraved lines to the surface.

Specifically, for example, in the first step, a random pattern of protrusions and recesses is transferred to both surfaces of a resin film using a pair of embossing rolls in the same shape as a device for transferring the pattern of protrusions and recesses. The embossing rolls used may be ones having a coarse main embossed pattern and a fine sub-embossed pattern produced by a method including forming random protrusions and recesses on the surfaces of a pair of iron rolls with an abrasive material, subjecting the iron rolls to vertical grinding, and then forming finer protrusions and recesses with a finer abrasive material on planar portions after the vertical grinding. Alternatively, in the first step, fine protrusions and recesses may be imparted by an extrusion lip embossing method which takes advantage of melt fracture.

In the second step, a pair of rolls including a metal roll having a surface milled with a triangular oblique line-type mill and a rubber roll having a JIS hardness of 65 to 75 is used as a device for transferring a pattern of protrusions and recesses. The resin film is passed through this device for transferring a pattern of protrusions and recesses to impart, to one surface of the resin film, protrusions and recesses in which recesses each have a groove shape with a continuous bottom (shape of an engraved line) and are arranged side by side in parallel to each other at equal intervals.

In order to adjust the Str of the surface with the recesses of the interlayer film for a laminated glass to 0.04 or lower, it is important that the resin film after the first step has an arithmetic average roughness Ra of 4 μm or less as measured in conformity with JIS B 0601(1994) (Condition 1). It is also important that in the second step, the linear velocity when the recesses in the shape of engraved lines are imparted to the resin film (when the resin film is passed through the device for transferring a pattern of protrusions and recesses) is 10 m/min or less (Condition 2).

In the first step, the fine protrusions and recesses are preferably imparted such that the arithmetic average roughness Ra is 1 μm or greater so as to prevent blocking in stacking the interlayer films for a laminated glass. At this time, when the arithmetic average roughness Ra of the fine protrusions and recesses is 4 μm or less, the surface with the recesses of the resulting interlayer film for a laminated glass can have a Str of 0.04 or lower. The arithmetic average roughness Ra of the resin film after the first step is preferably 2 μm or less.

The product (Ra×Sm) of the arithmetic average roughness Ra of the resin film after the first step as measured in conformity with JIS B 0601(1994) and the interval Sm between the recesses is preferably 2,500 or less. When the product (Ra×Sm) is 2,500 or less, the surface with the recesses can more reliably have a Str of 0.04 or lower.

In the second step, the resin film is passed through the device for transferring a pattern of protrusions and recesses to have the recesses in the shape of engraved lines. When the linear velocity in passing the resin film through the device for transferring a pattern of protrusions and recesses is 10 m/min or less, in other words, when the recesses in the shape of engraved lines are slowly shaped, the surface with the recesses of the resulting interlayer film for a laminated glass can have a Str of 0.04 or lower. The linear velocity in the second step is preferably 5 m/min or less.

The interlayer film for a laminated glass of the present invention preferably contains a thermoplastic resin.

Examples of the thermoplastic resin include polyvinylidene fluoride, polytetrafluoroethylene, vinylidene fluoride-propylene hexafluoride copolymers, polytrifluoroethylene, acrylonitrile-butadiene-styrene copolymers, polyesters, polyethers, polyamides, polycarbonates, polyacrylates, polymethacrylates, polyvinyl chloride, polyethylene, polypropylene, polystyrene, polyvinyl acetal, ethylene-vinyl acetate copolymers, polyoxymethylene (or polyacetal) resins, acetoacetal resins, polyvinyl benzyl acetal resins, and polyvinyl cumine acetal resins. The interlayer film for a laminated glass of the present invention contains preferably a polyvinyl acetal or ethylene-vinyl acetate copolymer, more preferably a polyvinyl acetal.

The polyvinyl acetal may be any polyvinyl acetal obtainable by acetalization of polyvinyl alcohol with an aldehyde. Preferred is polyvinyl butyral. Two or more types of polyvinyl acetal may be used in combination as needed.

The lower limit of the acetal group content of the polyvinyl acetal is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal is preferably 15 mol % and the upper limit thereof is preferably 40 mol %. With the hydroxy group content of 15 mol % or more, the adhesiveness between the interlayer film for a laminated glass and glass is improved. With the hydroxy group content of 40 mol % or less, the handleability of the interlayer film for a laminated glass is improved.

The acetal group content and the hydroxy group content can be measured in conformity with JIS K6728 "Testing methods for polyvinyl butyral".

The polyvinyl acetal can be prepared by acetalization of polyvinyl alcohol with an aldehyde.

The polyvinyl alcohol can be commonly prepared by saponification of polyvinyl acetate. Polyvinyl alcohol having a degree of saponification of 70 to 99.9 mol % is typically used. The degree of saponification of the polyvinyl alcohol is preferably 80 to 99.9 mol %.

The lower limit of the degree of polymerization of the polyvinyl alcohol is preferably 500 and the upper limit thereof is preferably 4,000. When the degree of polymerization of the polyvinyl alcohol is 500 or more, the laminated glass to be obtained has higher penetration resistance. When the degree of polymerization of the polyvinyl alcohol is 4,000 or less, formation of the interlayer film for a laminated glass is facilitated. The lower limit of the degree of polymerization of the polyvinyl alcohol is more preferably 1,000 and the upper limit thereof is more preferably 3,600.

Any aldehyde may be used, and commonly preferred is a C1-C10 aldehyde. Any C1-C10 aldehyde may be used, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, polyvinyl benzylaldehyde, and polyvinyl cuminaldehyde. In particular, n-butyraldehyde, n-hexylaldehyde, and n-valeraldehyde are preferred, and n-butyraldehyde is more preferred. Each of these aldehydes may be used alone, or two or more thereof may be used in combination.

The interlayer film for a laminated glass of the present invention preferably contains a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol-di-2-ethylbutyrate, triethylene glycol-di-n-octylate, and triethylene glycol-di-2-ethylhexylate.

Any polybasic organic acid ester may be used, and examples thereof include ester compounds of a polybasic organic acid (e.g., adipic acid, sebacic acid, and azelaic acid) and a C4-C8 linear or branched alcohol. In particular, preferred are dibutyl sebacate, dioctyl azelate, and dibutyl carbitol adipate.

Any organic ester plasticizer may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified sebacic alkyds, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

For less hydrolysis, the plasticizer contains preferably triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate.

The amount of the plasticizer in the interlayer film for a laminated glass of the present invention is not particularly limited. The lower limit thereof is preferably 30 parts by weight and the upper limit thereof is preferably 90 parts by weight based on 100 parts by weight of the polyvinyl acetal. When the amount of the plasticizer is 30 parts by weight or more, the interlayer film for a laminated glass has a low melt viscosity, improving the deaeration properties in the production of a laminated glass using the interlayer film for a laminated glass. When the amount of the plasticizer is 90 parts by weight or less, the transparency of the interlayer film for a laminated glass is improved. The lower limit of the amount of the plasticizer is more preferably 35 parts by weight and the upper limit thereof is more preferably 70 parts by weight, still more preferably 63 parts by weight.

When the amount of the plasticizer is 55 parts by weight or more, excellent sound insulation properties can be imparted to the interlayer film for a laminated glass.

The interlayer film for a laminated glass of the present invention preferably contains an adhesion modifier. The adhesion modifier contained adjusts the adhesion force to glass, resulting in production of a laminated glass excellent in penetration resistance.

The adhesion modifier used is suitably, for example, at least one selected from the group consisting of an alkali metal salt, an alkaline earth metal salt, and a magnesium salt. Examples of the adhesion modifier include salts of potassium, sodium, magnesium, and the like.

Examples of an acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

In the case where the interlayer film for a laminated glass of the present invention is required to have heat insulation properties, the interlayer film for a laminated glass may contain a heat ray absorber.

The heat ray absorber may be any heat ray absorber that can block infrared rays. Specifically, preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, cesium-doped tungsten oxide (CWO) particles, lanthanum hexaboride particles, and cerium hexaboride particles.

In the case where the interlayer film for a laminated glass of the present invention is required to have luminescent properties, the interlayer film for a laminated glass may contain a luminescent material.

The luminescent material may be any luminescent material that can become luminous under irradiation with excitation light. Examples thereof include lanthanoid complexes having a ligand containing a halogen atom and luminescent materials having a terephthalic acid ester structure.

The interlayer film for a laminated glass of the present invention may include conventional additives such as a UV blocking agent, an antioxidant, a light stabilizer, a modified silicone oil as an adhesion modifier, a flame retardant, an antistatic agent, a moisture-proof agent, a heat ray reflecting agent, a heat ray absorber, an anti-blocking agent, and a colorant made of a pigment or dye, as needed.

The interlayer film for a laminated glass of the present invention may have a single-layer structure or a multilayer structure including a plurality of layers stacked together.

In the case where the interlayer film for a laminated glass of the present invention has a multilayer structure, various functions can be imparted to the obtained interlayer film for a laminated glass by controlling the components of each of the combined layers.

For example, in order to impart sound insulation properties to the interlayer film for a laminated glass of the present invention, the amount of the plasticizer (hereafter, also referred to as amount X) relative to 100 parts by weight of the thermoplastic resin in one layer may be controlled to be more than the amount of the plasticizer (hereafter, also referred to as amount Y) relative to 100 parts by weight of the thermoplastic resin in the different layer. In this case, the amount X is more than the amount Y preferably by 5 parts by weight or more, more preferably by 10 parts by weight or more, still more preferably by 15 parts by weight or more. For allowing the interlayer film for a laminated glass to have higher penetration resistance, the difference between the amount X and the amount Y is preferably 50 parts by weight or less, more preferably 40 parts by weight or less, still more preferably 35 parts by weight or less. The difference between the amount X and the amount Y is calculated based on the equation:

(difference between the amount $X$ and the amount $Y$)=(the amount $X$− the amount $Y$).

The lower limit of the amount X is preferably 45 parts by weight and the upper limit thereof is preferably 80 parts by weight. The lower limit is more preferably 50 parts by weight and the upper limit is more preferably 75 parts by weight. The lower limit is still more preferably 55 parts by weight and the upper limit is still more preferably 70 parts by weight. When the amount X is adjusted to the preferable lower limit or more, high sound insulation properties can be exerted. When the amount X is adjusted to the preferable upper limit or less, the plasticizer can be prevented from bleeding out, so that a reduction in the transparency or the adhesiveness of the interlayer film for a laminated glass can be prevented.

The lower limit of the amount Y is preferably 20 parts by weight and the upper limit thereof is preferably 45 parts by weight. The lower limit is more preferably 30 parts by weight and the upper limit is more preferably 43 parts by weight. The lower limit is still more preferably 35 parts by weight and the upper limit is still more preferably 41 parts by weight. When the amount Y is adjusted to the preferable lower limit or more, high penetration resistance can be exerted. When the amount Y is adjusted to the preferable upper limit or less, the plasticizer can be prevented from bleeding out, so that a reduction in the transparency or the adhesiveness of the interlayer film for a laminated glass can be prevented.

In order to impart sound insulation properties to the interlayer film for a laminated glass of the present invention, the thermoplastic resin in the one layer is preferably a polyvinyl acetal X. The polyvinyl acetal X can be prepared by acetalization of polyvinyl alcohol with an aldehyde. The polyvinyl alcohol can be commonly prepared by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or higher, the penetration resistance of the interlayer film for a laminated glass to be obtained can be improved. When the average degree of polymerization of the polyvinyl alcohol is 5,000 or lower, formability of the interlayer film for a laminated glass can be ensured. The lower limit of the average degree of polymerization of the polyvinyl alcohol is more preferably 500 and the upper limit thereof is more preferably 4,000. The average degree of polymerization of the polyvinyl alcohol is determined by a method in accordance with "Testing methods for polyvinyl alcohol" in JIS K 6726.

The lower limit of the carbon number of an aldehyde used for acetalization of the polyvinyl alcohol is preferably 4 and the upper limit thereof is preferably 6. When an aldehyde having 4 or more carbon atoms is used, a sufficient amount of the plasticizer can be stably contained so that excellent sound insulation properties can be obtained. Moreover, bleeding out of the plasticizer can be prevented. When an aldehyde having 6 or less carbon atoms is used, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the plasticizer can be contained in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %.

The hydroxy group content of the polyvinyl acetal X is a value in percentage (mol %) of the mol fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy groups are bonded in the polyvinyl acetal X by a method in accordance with "Testing methods for polyvinyl butyral" in JIS K 6728.

The lower limit of the acetal group content of the polyvinyl acetal X is preferably 60 mol % and the upper limit thereof is preferably 85 mol %. When the acetal group content of the polyvinyl acetal X is 60 mol % or more, the one layer has higher hydrophobicity and can contain the plasticizer in an amount needed for exhibiting sound insulation properties, and bleeding out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol % or more.

The acetal group content can be determined by measuring the amount of ethylene groups to which acetal groups are bonded in the polyvinyl acetal X by a method in accordance with "Testing methods for polyvinyl butyral" in JIS K 6728.

The lower limit of the acetyl group content of the polyvinyl acetal X is preferably 0.1 mol % and the upper limit thereof is preferably 30 mol %. When the acetyl group content of the polyvinyl acetal X is 0.1 mol % or more, the plasticizer can be contained in an amount needed for exhibiting sound insulation properties, and bleeding out of the plasticizer can be prevented. When the acetyl group content of the polyvinyl acetal X is 30 mol % or less, the one layer has higher hydrophobicity to prevent whitening. The lower limit of the acetyl group content of the polyvinyl acetal X is more preferably 1 mol %, still more preferably 5 mol %, particularly preferably 8 mol %, and the upper limit thereof is more preferably 25 mol %, still more preferably 20 mol %.

The acetyl group content is a value in percentage (mol %) of the mol fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

The polyvinyl acetal X is preferably a polyvinyl acetal with the acetyl group content of 8 mol % or more or a polyvinyl acetal with the acetyl group content of less than 8 mol % and the acetal group content of 65 mol % or more. In this case, the one layer can readily contain the plasticizer in an amount needed for exhibiting sound insulation properties. The polyvinyl acetal X is more preferably a polyvinyl acetal having the acetyl group content of 8 mol % or more or a polyvinyl acetal having the acetyl group content of less than 8 mol % and the acetal group content of 68 mol % or more.

In order to impart sound insulation properties to the interlayer film for a laminated glass of the present invention, the thermoplastic resin in the different layer is preferably a polyvinyl acetal Y. The polyvinyl acetal Y preferably has a greater hydroxy group content than the polyvinyl acetal X.

The polyvinyl acetal Y can be prepared by acetalization of polyvinyl alcohol with an aldehyde. The polyvinyl alcohol can be commonly obtained by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the interlayer film for a laminated glass can be improved. When the average degree of polymerization of the polyvinyl alcohol is 5,000 or less, the formability of the different layer can be ensured. The lower limit of the average degree of polymerization of the polyvinyl alcohol is more preferably 500 and the upper limit thereof is more preferably 4,000.

The lower limit of the carbon number of an aldehyde used for acetalization of the polyvinyl alcohol is preferably 3 and the upper limit thereof is preferably 4. When the aldehyde having 3 or more carbon atoms is used, the penetration resistance of the interlayer film for a laminated glass is improved. When the aldehyde having 4 or less carbon atoms is used, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the hydroxy group content of the polyvinyl acetal Y is 33 mol % or less, whitening of the interlayer film for a laminated glass can be prevented. When the hydroxy group content of the polyvinyl acetal Y is 28 mol % or more, the penetration resistance of the interlayer film for a laminated glass can be improved.

The lower limit of the acetal group content of the polyvinyl acetal Y is preferably 60 mol % and the upper limit thereof is preferably 80 mol %. When the acetal group content is 60 mol % or more, the plasticizer in an amount needed for exhibiting sufficient penetration resistance can be contained. When the acetal group content is 80 mol % or less, the adhesiveness between the different layer and glass can be ensured. The lower limit of the acetal group content of the polyvinyl acetal Y is more preferably 65 mol % and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the different layer has higher hydrophobicity, thereby preventing whitening. The upper limit of the acetyl group content of the polyvinyl acetal Y is more preferably 2 mol %, and the lower limit thereof is preferably 0.1 mol %.

The hydroxy group content, acetal group content, and acetyl group content of the polyvinyl acetal Y can be measured by the same methods as those described for the polyvinyl acetal X.

In order to impart heat insulation properties to the interlayer film for a laminated glass of the present invention, for example, one, two, or all of the layers constituting the multilayer structure may contain a heat ray absorber.

The heat ray absorber may be any heat ray absorber that can block infrared rays. Specifically, preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The interlayer film for a laminated glass of the present invention may have any thickness. The lower limit of the thickness is preferably 50 µm and the upper limit thereof is preferably 1,700 µm. The lower limit is more preferably 100 µm and the upper limit is more preferably 1,000 µm. The upper limit is still more preferably 900 µm. The lower limit of the thickness of the interlayer film for a laminated glass means the thickness of the thinnest portion of the interlayer film for a laminated glass. The upper limit of the thickness of the interlayer film for a laminated glass means the thickness of the thickest portion of the interlayer film for a laminated glass.

The interlayer film for a laminated glass of the present invention may have a wedge-shaped cross section. In the case where the interlayer film for a laminated glass has a wedge-shaped cross section, adjustment of the wedge angle θ of the wedge shape according to the mounting angle of the laminated glass can prevent occurrence of double images or ghost images in a head-up display which allows the driver to see the front visual field and the meter image at the same time without turning the driver's eyes downward. For further preventing occurrence of double images, the lower limit of the wedge angle θ is preferably 0.1 mrad, more preferably 0.2 mrad, still more preferably 0.3 mrad and the upper limit is preferably 1 mrad, more preferably 0.9 mrad.

In the case where the interlayer film for a laminated glass having a wedge-shaped cross section is produced by, for example, extrusion molding a resin composition using an extruder, the interlayer film may have its minimum thickness in a region slightly inward from one end on the thinner side (specifically, a region spaced inward from one end on the thinner side by a distance of 0X to 0.2X where X is the distance between the one end and the other end). The interlayer film may also have its maximum thickness in a region slightly inward from one end on the thicker side (specifically, a region spaced inward from one end on the thicker side by a distance of 0X to 0.2X where X is the distance between the one end and the other end). Herein, such a shape is included in the wedge shape. The distance X between the one end and the other end of the interlayer film for a laminated glass is preferably 3 m or shorter, more preferably 2 m or shorter, particularly preferably 1.5 m or shorter and is preferably 0.5 m or longer, more preferably 0.8 m or longer, particularly preferably 1 m or longer.

The wedge angle θ of the interlayer film for a laminated glass having a wedge-shaped cross section means the interior angle at the intersection of a straight line connecting a thickest portion and a thinnest portion on one surface of the interlayer film for a laminated glass and a straight line connecting a thickest portion and a thinnest portion on the other surface.

In the case where the surfaces have a plurality of thickest portions or thinnest portions, in the case where the thickest portion is in the region spaced from one end on the thicker side by a distance of 0X to 0.2X, or in the case where the thinnest portion is in the region spaced from one end on the thinner side by a distance of 0X to 0.2X, the thickest portion and the thinnest portion are selected to maximize the wedge angle θ to be obtained.

In the case of the interlayer film for a laminated glass of the present invention having a wedge-shaped cross section, the interlayer film for a laminated glass preferably has a multilayer structure including one layer and a different layer (hereafter, also referred to as a "shape-adjusting layer"). The cross-sectional shape of the entire interlayer film for a laminated glass can be controlled to have a wedge shape with a certain wedge angle by controlling the thickness of the one layer to be within a certain range and stacking the shape-adjusting layer. The shape-adjusting layer may be stacked on only one or both of the surfaces of the one layer. Further, multiple shape-adjusting layers may be stacked.

The interlayer film for a laminated glass of the present invention may be produced by any method, and a conventionally known method may be used. In an exemplary method, the thermoplastic resin is kneaded with other component(s) added as needed, and the mixture is extrusion-molded.

Any kneading method may be used. Examples of the method include a method using an extruder, a plastograph, a kneader, a Banbury mixer, or a calender roll.

The present invention also encompasses a laminated glass including a pair of glass plates and the interlayer film for a laminated glass of the present invention interposed between the pair of glass plates.

The glass plates may be transparent plate glass commonly used. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass having a UV light-shielding coat layer on the surface of glass. Moreover, organic plastic plates such as polyethylene terephthalate, polycarbonate, or polyacrylate plates may also be used.

As the glass plates, two or more kinds of glass plates may be used. Exemplary cases thereof include a laminated glass in which the interlayer film for a laminated glass of the present invention is interposed between a transparent float plate glass and a colored glass plate such as green glass. Moreover, as the glass plates, two or more kinds of glass plates different in the thickness may be used.

The laminated glass of the present invention can be suitably produced by a vacuum deaeration method.

In the vacuum deaeration method, a laminate including an interlayer film for a laminated glass interposed between at least two glass plates is placed in a rubber bag, and vacuum suctioned for removal of air remaining between the glass plates and the interlayer film so as to be preliminarily pressure bonded. The laminate is then pressurized with heat, for example, in an autoclave for final pressure bonding to provide a laminated glass.

In the interlayer film for a laminated glass of the present invention, the surface with the recesses has a texture aspect ratio Str lower than or equal to a certain value, thus preventing preceding sealing and enabling production of a laminated glass having high visible light transmittance even when the deaeration for the preliminary pressure bonding and the heating for the final pressure bonding are performed in parallel in the vacuum deaeration method to shorten the process duration.

Advantageous Effects of Invention

The present invention can provide an interlayer film for a laminated glass that enables production of a laminated glass having high visible light transmittance even when deaeration for preliminary pressure bonding and heating for final pressure bonding are performed in parallel in a vacuum deaeration method. The present invention also can provide a method for producing the interlayer film for a laminated glass and a laminated glass including the interlayer film for a laminated glass.

DESCRIPTION OF EMBODIMENTS

Figure 1:
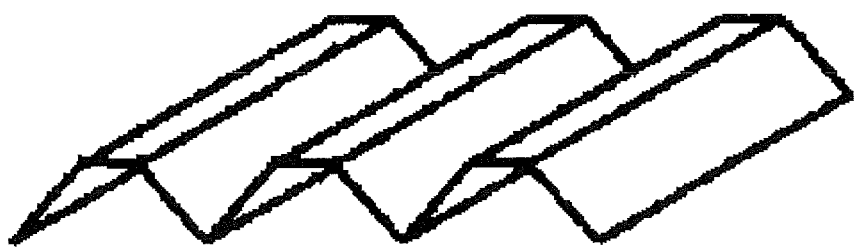
FIG. 1 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 2:
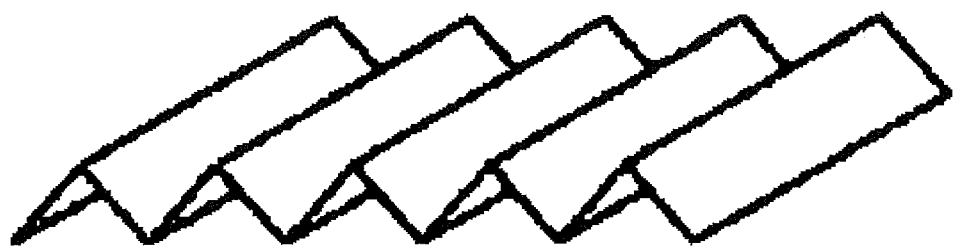
FIG. 2 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 3:
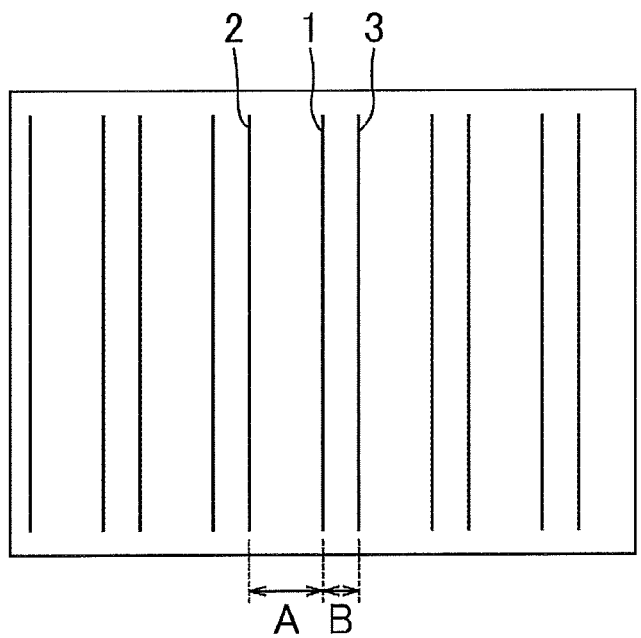
FIG. 3 is a schematic view illustrating an exemplary interlayer film for a laminated glass in which recesses each having a groove shape with a continuous bottom are arranged on a surface at unequal intervals and adjacent recesses are arranged side by side in parallel to each other.

Embodiments of the present invention are specifically described in the following with reference to, but not limited to, examples.

Example 1

(1) Preparation of Resin Film

Polyvinyl alcohol having an average degree of polymerization of 1,700 was acetalized with n-butyraldehyde to give polyvinyl butyral having an acetyl group content of 1 mol %, a butyral group content of 69 mol %, and a hydroxy group content of 30 mol %. To 100 parts by mass of the obtained polyvinyl butyral were added 39 parts by mass of a plasticizer and an adhesion modifier at a magnesium concentration in the film of 50 ppm. The mixture was kneaded well with a mixing roll to give a resin composition. The plasticizer used was triethylene glycol-di-2-ethylhexanoate (3GO). The adhesion modifier used was a 50% by mass:50% by mass mixture of magnesium bis(2-ethyl butyrate) and magnesium acetate.

The obtained resin composition was extruded using an extruder to give a single-layer interlayer film for a laminated glass having a thickness of 760 μm.

(2) First Step

Embossing rolls having a coarse main embossed pattern and a fine sub-embossed pattern were prepared by a method including forming random protrusions and recesses on the surfaces of iron rolls with an abrasive material, subjecting the iron rolls to vertical grinding, and further forming finer protrusions and recesses with a finer abrasive material on planar portions after the vertical grinding. As a first step, using the pair of embossing rolls as a device for transferring a pattern of protrusions and recesses, a random pattern of protrusions and recesses was transferred to both surfaces of the resin film.

The transferring conditions employed here were a temperature of the interlayer film for a laminated glass of 80° C., a temperature of the rolls of 145° C., a linear velocity of 10 m/min, a line width of 1.5 m, and a press linear pressure of 1 to 100 kN/m.

The resin film after the first step was subjected to measurements of the arithmetic average roughness Ra and the interval Sm between the recesses by methods in conformity with JIS B 0601(1994). The measurements were performed in an environment at a temperature of 23° C. and a humidity of 30 RH % under the conditions of a cut-off value of 2.5 mm, a standard length of 2.5 mm, a spare length of 2.5 mm, an evaluation length of 12.5 mm, a tip radius of the probe of 2 μm, a tip angle of 60°, and a measurement speed of 0.5 mm/s.

In the case where the Sm exceeds 450 μm, the measurements may be inaccurate with a standard length of 2.5 mm. In such a case, the measurement was performed by changing the cut-off value to 8 mm or longer.

(3) Second Step

In the second step, a pair of rolls including a metal roll having a surface milled with a triangular oblique line-type mill and a rubber roll having a JIS hardness of 65 to 75 was used as a device for transferring a pattern of protrusions and recesses. The resin film after the first step was passed through the device for transferring a pattern of protrusions and recesses to impart, to one surface of the resin film, protrusions and recesses in which recesses each had a groove shape with a continuous bottom (shape of an engraved line) and were arranged side by side in parallel to each other at equal intervals. The transferring conditions employed here were a temperature of the resin film of 70° C., a temperature of the rolls of 140° C., a linear velocity of 10 m/min, and a press linear pressure of 1 to 100 kN/m.

Subsequently, the same operations were performed on the other surface of the resin film to impart recesses each having a groove shape with a continuous bottom (shape of an engraved line).

The resin film after the second step was subjected to measurements of the ten-point average roughness Rz, the arithmetic average roughness Ra, and the interval Sm between the recesses by methods in conformity with JIS B 0601(1994). The measurements were performed in a direction perpendicular to the groove shape with a continuous bottom in an environment at a temperature of 23° C. and a humidity of 30 RH % under the conditions of a cut-off value of 2.5 mm, a standard length of 2.5 mm, a spare length of 2.5 mm, an evaluation length of 12.5 mm, a tip radius of the probe of 2 μm, a tip angle of 60°, and a measurement speed of 0.5 mm/s.

In the case where the Sm exceeds 450 μm, the measurements may be inaccurate with a standard length of 2.5 mm. In such a case, the measurement was performed by changing the cut-off value to 8 mm or longer.

(4) Measurement of Str

The Str was measured in an environment at a temperature of 23° C. and a humidity of 30 RH % by the following method.

A surface of the interlayer film for a laminated glass was analyzed using a three-dimensional white light interference microscope (ContourGT-K available from Bruker AXS GmbH) in a 2 mm square field of view at an objective lens magnification of 50 times, an internal lens magnification of 0.5 times, and a resolution set to "half resolution" to obtain images. In this operation, the light quantity and threshold were set as appropriate to minimize noise in the analysis. The obtained images were subjected to planarization and noise removal processes, and coarse protrusions and recesses were removed using a Gaussian filter. Then, the Str value was calculated by a method specified in ISO 25178.

Analytical software "Vision64" included in the apparatus was used in image processing. The planarization process involved the following first to third processing operations. As the first processing, the processing "Terms Removal (F-Operator)" on Analysis Toolbox was performed under the analysis condition "Tilt only (Plane Fit)". As the second processing, the processing "Statistic Filter" was performed under the analysis conditions "Filter type: median" and "Filter size: 3". As the third processing, the processing "data Restore" was performed by selecting the analysis condition "Legacy", selecting Restore Edge condition, and setting Iteration condition to a value for sufficient data complement. As the noise removal processing (fourth processing), the processing "Gaussian Regression Filter" was performed under the analysis conditions "under Band pass condition, order: 0, Type: Regular, Long wavelength cutoff: 1 mm, and Short wavelength cutoff: 0.002 mm". At this time, the advance setup was performed under initial conditions. The image data after the first processing through the fourth processing was subjected to the fifth processing "S parameters-Spatial" under the analysis condition "Angle resolution: 1 deg, Search range: From 0 to 90". The resulting "Str" was used as the Str value.

The measurement was performed on two points in the center portion of a 10 cm square sample of the interlayer film for a laminated glass. The average of the obtained values was used as the Str value. Otherwise the measurement was in conformity with ISO 25178(2012).

The Str was measured on both an interlayer film for a laminated glass (before heating) not heated after production and an interlayer film for a laminated glass (after heating) heated at 100° C. for 15 minutes by the following method.

A 5-mm-thick stainless steel plate and three 2.5-mm-thick clear glass plates were placed in a gear oven, and each plate was heated to a surface temperature of 100° C. Before heating to 100° C., the surface of the stainless steel plate to be in contact with the interlayer film for a laminated glass in the subsequent step was surface-treated with a silicone release agent (available from Shin-Etsu Chemical Co., Ltd., SEPA-COAT SP). After the surface temperatures of the stainless steel plate and the clear glass plates reached 100° C., the temperature of the gear oven itself was set at 100° C. On the stainless steel plate was placed the interlayer film for a laminated glass cut to a size of 10 cm×10 cm. On the interlayer film was placed a polyethylene terephthalate (PET) sheet cut to a frame shape having an inside dimensions of 7 cm×7 cm and a thickness of 50 μm. On the PET sheet were placed the three 2.5-mm-thick clear glass plates (10 cm×10 cm) heated to 100° C. Here, the interlayer film for a laminated glass and the PET sheet had been left to stand in an atmosphere at a temperature of 23° C. and a humidity of 30% for three hours before placed on, respectively, the stainless steel plate and the interlayer film for a laminated glass.

The interlayer film for a laminated glass was held in the gear oven at 100° C. for 15 minutes. The interlayer film was then taken out, transferred onto a 23° C. stainless steel plate, and cooled thereon. The measurement of the Str was performed on the center portion on the surface on the stainless steel side.

Examples 2 to 13 and Comparative Examples 1 to 6

An interlayer film for a laminated glass having recesses in the shape of engraved lines on the surfaces was produced as in Example 1 except that the conditions for the first step and the second step were changed as shown in Table 1 or 2. The linear velocities in the first step and the second step were the same.

In Example 6 and Comparative Example 4, the die used for extruding a resin film through an extruder had a lip shape for a lip method. Specifically, a resin film having fine protrusions and recesses on the surfaces was obtained using a lip die with a lip gap of 0.7 to 1.4 mm by a method in which the temperature of the resin composition at the inlet of the die was adjusted to 150° C. to 270° C., the temperature of the lip die was adjusted to 210° C., the line speed was 10 m/min, and the variation range of the inlet pressure of the extruder within 30 seconds was controlled to 0.4% or less. In Example 6 and Comparative Example 4, this operation was performed instead of the first step.

Example 14

(1) Preparation of Resin Film

Polyvinyl alcohol having an average degree of polymerization of 1,700 was acetalized with n-butyraldehyde to give polyvinyl butyral having an acetyl group content of 1 mol %, a butyral group content of 69 mol %, and a hydroxy group content of 30 mol %. To 100 parts by mass of the obtained polyvinyl butyral were added 39 parts by mass of a plasticizer and an adhesion modifier at a magnesium concentration in the film of 50 ppm. The mixture was kneaded well with a mixing roll to give a resin composition. The plasticizer used was triethylene glycol-di-2-ethylhexanoate (3GO). The adhesion modifier used was a 50% by mass:50% by mass mixture of magnesium bis(2-ethyl butyrate) and magnesium acetate.

The obtained resin composition was extruded through an extruder into a resin film having a wedge-shaped cross section. The obtained resin film had a minimum thickness at one end and a maximum thickness at the other end, and did not have a uniform thickness portion. The distance between the one end and the other end of the obtained resin film was 1 m.

An interlayer film for a laminated glass having recesses in the shape of engraved lines on the surfaces was produced as in Example 1 except that the obtained resin film having a wedge-shaped cross section was used, and that the conditions for the first step and the second step were changed as shown in Table 3. The linear velocities in the first step and the second step were the same.

The obtained interlayer film was subjected to measurements of the minimum thickness, the maximum thickness, the cross-sectional shape, and the wedge angle. The obtained values were shown in Table 3.

Examples 15 to 17 and Comparative Example 7

A resin film having a wedge-shaped cross section was obtained by adjusting the extruding conditions such that the minimum thickness, the maximum thickness, the cross-sectional shape, and the wedge angle of the resulting interlayer film were as shown in Table 3.

An interlayer film for a laminated glass having recesses in the shape of engraved lines on the surfaces was produced as in Example 14 except that the obtained resin film having a wedge-shaped cross section was used, and that the conditions for the first step and the second step were changed as shown in Table 3. The linear velocities in the first step and the second step were the same.

Example 18

(1) Preparation of Composition for First Resin Layer

Polyvinyl alcohol having an average degree of polymerization of 1,700 was acetalized with n-butyraldehyde to give polyvinyl butyral having an acetyl group content of 1 mol %, a butyral group content of 69 mol %, and a hydroxy group content of 30 mol %. To 100 parts by mass of the obtained polyvinyl butyral were added 36 parts by mass of a plasticizer and an adhesion modifier at a magnesium concentration in the film of 50 ppm. The mixture was kneaded well with a mixing roll to give resin composition for a first resin layer.

The plasticizer used was triethylene glycol-di-2-ethylhexanoate (3GO). The adhesion modifier used was a 50% by mass:50% by mass mixture of magnesium bis(2-ethyl butyrate) and magnesium acetate.

(2) Preparation of Composition for Second Resin Layer

Polyvinyl alcohol having an average degree of polymerization of 2,300 was acetalized with n-butyraldehyde to give polyvinyl butyral having an acetyl group content of 12.5 mol %, a butyral group content of 64 mol %, and a hydroxy group content of 23.5 mol %. To 100 parts by mass of the obtained polyvinyl butyral were added 76.5 parts by mass of triethylene glycol-di-2-ethylhexanoate (3GO) as a plasticizer. The mixture was kneaded well with a mixing roll to give a resin composition for a second resin layer.

(3) Preparation of Resin Film

The obtained resin composition for a first resin layer and resin composition for a second resin layer were co-extruded using a co-extruder to prepare a resin film having a rectangular cross section and a laminated structure (first resin layer/second resin layer/first resin layer).

An interlayer film for a laminated glass having recesses in the shape of engraved lines on the surfaces was produced as in Example 1 except that the obtained resin film having a rectangular cross section was used, and that the conditions for the first step and the second step were changed as shown in Table 4. The linear velocities in the first step and the second step were the same.

The obtained interlayer film was subjected to measurements of the average thicknesses of the first resin layer, the second resin layer, and the interlayer film. The obtained values were shown in Table 4.

Examples 19 to 23 and Comparative Example 8

A resin composition for a first resin layer and a resin composition for a second resin layer were prepared by changing the amounts of the polyvinyl butyral and plasticizer as shown in Table 4. A resin film having a rectangular cross section and a laminated structure (first resin layer/second resin layer/first resin layer) was prepared by adjusting the co-extruding conditions such that the average thicknesses of the first resin layer, the second resin layer, and the interlayer film were as shown in Table 4.

An interlayer film for a laminated glass having recesses in the shape of engraved lines on the surfaces was produced as in Example 18 except that the obtained resin film having a rectangular cross-section was used, and that the conditions for the first step and the second step were changed as shown in Table 4. The linear velocities in the first step and the second step were the same.

Example 24

(1) Preparation of Composition for First Resin Layer

Polyvinyl alcohol having an average degree of polymerization of 1,700 was acetalized with n-butyraldehyde to give polyvinyl butyral having an acetyl group content of 1 mol %, a butyral group content of 69 mol %, and a hydroxy group content of 30 mol %. To 100 parts by mass of the obtained polyvinyl butyral were added 36.0 parts by mass of a plasticizer and an adhesion modifier at a magnesium concentration in the film of 50 ppm. The mixture was kneaded well with a mixing roll to provide a resin composition for a first resin layer.

The plasticizer used was triethylene glycol-di-2-ethylhexanoate (3GO). The adhesion modifier used was a 50% by mass:50% by mass mixture of magnesium bis(2-ethyl butyrate) and magnesium acetate.

(2) Preparation of Composition for Second Resin Layer

Polyvinyl alcohol having an average degree of polymerization of 2,300 was acetalized with n-butyraldehyde to give polyvinyl butyral having an acetyl group content of 12.5 mol %, a butyral group content of 64 mol %, and a hydroxy group content of 23.5 mol %. To 100 parts by mass of the obtained polyvinyl butyral were added 76.5 parts by mass of triethylene glycol-di-2-ethylhexanoate (3GO) as a plasticizer. The mixture was kneaded well with a mixing roll to give a resin composition for a second resin layer.

(3) Preparation of Resin Film

The obtained resin composition for a first resin layer and resin composition for a second resin layer were co-extruded using a co-extruder to prepare a resin film having a wedge-shaped cross section and a laminated structure (first resin layer/second resin layer/first resin layer). The obtained resin film having a wedge-shaped cross section had a minimum thickness at one end and a maximum thickness at the other end, and did not have a uniform thickness portion. The distance between the one end and the other end of the obtained interlayer film having a wedge-shaped cross section was 1 m.

An interlayer film for a laminated glass having recesses in the shape of engraved lines on the surfaces was produced as in Example 1 except that the obtained resin film having a wedge-shaped cross section was used, and that the conditions for the first step and the second step were changed as shown in Table 5. The linear velocities in the first step and the second step were the same.

The obtained interlayer film was subjected to measurements of the minimum thickness, the maximum thickness, the cross-sectional shape, and the wedge angle of the first resin layer, the second resin layer, and the interlayer film. The obtained values were shown in Table 5.

Comparative Example 9

A resin composition for a first resin layer and a resin composition for a second resin layer were prepared by changing the amounts of the polyvinyl butyral and plasticizer as shown in Table 5. A resin film having a wedge-shaped cross section and a laminated structure (first resin layer/second resin layer/first resin layer) was prepared by adjusting the co-extruding conditions such that the minimum thickness, the maximum thickness, the cross-sectional shape, and the wedge angle of the first resin layer, the second resin layer, and the interlayer film were as shown in Table 5.

An interlayer film for a laminated glass having recesses in the shape of engraved lines on the surfaces was produced as in Example 24 except that the obtained resin film having a wedge-shaped cross section was used, and that the conditions for the first step and the second step were changed as shown in Table 5. The linear velocities in the first step and the second step were the same.

(Evaluation)

The interlayer films for a laminated glass and laminated glasses obtained in the examples and comparative examples were evaluated by the following methods.

Tables 1 to 5 show the results.

(1) Evaluation of Deaeration Properties (23° C. to 90° C.)

For Examples 1 to 13, Comparative Examples 1 to 6, Examples 18 to 23, and Comparative Example 8, the obtained interlayer film for a laminated glass was interposed between two clear glass plates (15 cm in length×15 cm in width×2.5 mm in thickness), and the interlayer film portions protruding from the laminate were cut to prepare a laminate for evaluation.

For Examples 14 to 17, Comparative Example 7, Example 24, and Comparative Example 9, the interlayer film for a laminated glass was interposed between two clear glass plates such that the one end having the minimum thickness of the interlayer film for a laminated glass was included in the laminate, and that one end of each clear glass plate was aligned with the end having the minimum thickness of the interlayer film for a laminated glass. The interlayer film portions protruding from the laminate were cut to prepare a laminate for evaluating the thinnest portion. Separately, the interlayer film for a laminated glass was interposed between two glass plates such that the one end having the maximum thickness of the interlayer film for a laminated glass was included in the laminate, and that one end of each clear glass plates was aligned with the end having the maximum thickness of the interlayer film for a laminated glass. The interlayer film portions protruding from the laminate were cut to prepare a laminate for evaluating the thickest portion.

Since the interlayer films for a laminated glass having a wedge-shaped cross section produced in the examples and comparative examples of the present application had the minimum thickness at one end and the maximum thickness at the other end, the laminates for evaluating the thinnest portion and the laminates for evaluating the thickest portion were prepared by the above process. In the case of an interlayer film for a laminated glass having the minimum thickness and the maximum thickness at portions other than the ends, the laminate for evaluating the thinnest portion and the laminate for evaluating the thickest portion are preferably produced such that the portion having the minimum thickness and the portion having the maximum thickness are positioned in the middle of the clear glass plates. When it is difficult to position the portion having the minimum thickness and the portion having the maximum thickness in the middle of the clear glass plates, the laminate for evaluating the thinnest portion and the laminate for evaluating the thickest portion may be produced by the above process such that one end of each clear glass plate was aligned with one end of the interlayer film for a laminated glass.

The obtained laminate for evaluation, laminate for evaluating the thinnest portion, and laminate for evaluating the thickest portion were each stored at 23° C. and 30 RH % until the surface temperature of the glass reached 23° C. The laminate was then transferred into a rubber bag. The rubber bag was connected to a vacuum suction device, and heating and depressurization were simultaneously performed to heat the laminate under reduced pressure of −600 mmHg such that the surface temperature of the glass of the laminate (preliminary pressure bonding temperature) reached 90° C. after 14 minutes. Thereafter, the laminate was cooled until the surface temperature of the glass of the laminate reached 40° C., and then the pressure was returned to atmospheric pressure to complete the preliminary pressure bonding.

The preliminary pressure-bonded laminate was put in an autoclave and held under the conditions of a temperature of 140° C. and a pressure of 1,300 kPa for 10 minutes. The temperature was then lowered to 50° C. and the pressure was returned to atmospheric pressure to complete the final pressure bonding. A laminated glass was thus obtained.

The parallel light transmittance Tp (%) of the laminate after the preliminarily pressure bonding in the production of the laminated glass was measured with a haze meter (HM-150 available from Murakami Color Research Laboratory) in conformity with JIS K 7105.

Figure 4:
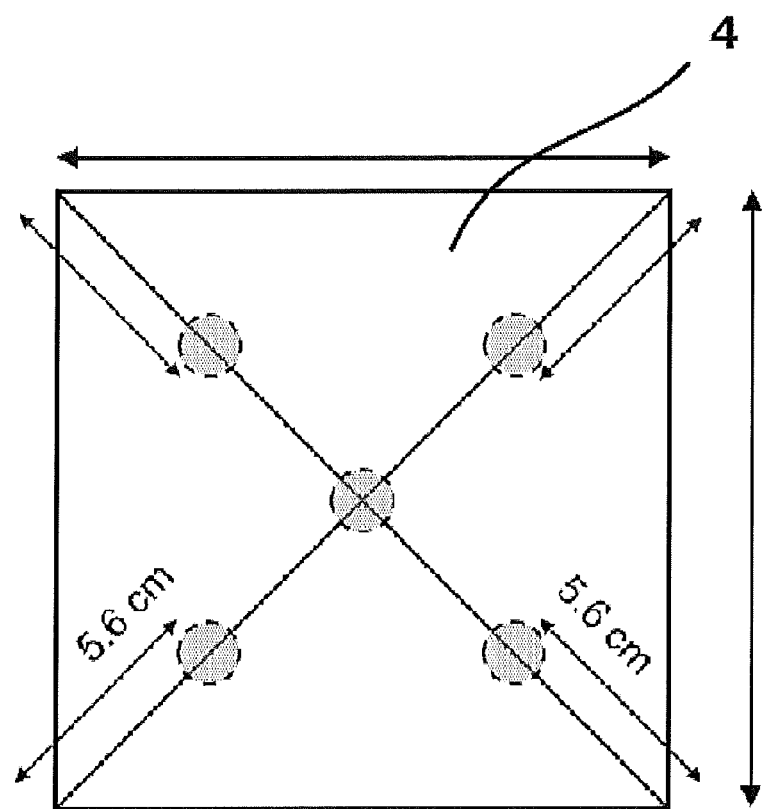
FIG. 4 is a schematic view explaining positions where parallel light transmittance Tp is measured in a laminate after preliminary pressure bonding in production of a laminated glass in examples.

FIG. 4 is a schematic view explaining positions where the parallel light transmittance Tp is measured. With respect to the laminate of 15 cm in length×15 cm in width, the parallel light transmittance was measured at five points (the points surrounded by dotted lines in FIG. 4): the center at which two diagonals of the laminate intersect; and four points 5.6 cm away in the diagonal direction from the apexes of the laminate. The average of the measured values was taken as the parallel light transmittance Tp.

Reduction in transparency of the laminated glass is caused by defective deaeration during preliminary pressure bonding. Accordingly, the deaeration properties of the interlayer film for a laminated glass can be evaluated more precisely by measurement of the parallel light transmittance of the laminate after preliminarily pressure bonding than analysis of foaming in the laminated glass.

For use in applications such as automotive windshields, the parallel light transmittance Tp needs to be at least 56%.

(2) Evaluation of Deaeration Properties (50° C. to 90° C.)

A laminate for evaluation, a laminate for evaluating the thinnest portion, and a laminate for evaluating the thickest portion were obtained as in the evaluation of deaeration properties (23° C. to 90° C.)

The obtained laminate for evaluation, laminate for evaluating the thinnest portion, and laminate for evaluating the thickest portion were each stored in a gear oven until the surface temperature of the glass reached 50° C. The laminate was then transferred into a rubber bag preheated to 50° C., and stored therein for three minutes. The rubber bag was then connected to a vacuum suction device to perform depressurization. The laminate was heated under reduced pressure of −600 mmHg such that the surface temperature of the glass of the laminate (preliminary pressure bonding temperature) reached 90° C. after 14 minutes. Thereafter, the laminate was cooled until the surface temperature of the glass of the laminate reached 40° C., and then the pressure was returned to atmospheric pressure to complete the preliminary pressure bonding.

The preliminary pressure-bonded laminate was put in an autoclave and stored under the conditions of a temperature of 140° C. and a pressure of 1,300 kPa for 10 minutes. The temperature was then lowered to 50° C. and the pressure was returned to atmospheric pressure to complete the final pressure bonding. A laminated glass was thus obtained.

The parallel light transmittance Tp (%) of the laminate after the preliminary pressure bonding in the production of the laminated glass was measured in the same manner as above.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Production | First Step | Impartment of protrusions and recesses | | Roll embossment | Roll embossment | Roll embossment | Roll embossment | Roll embossment | Melt fracture | Roll embossment | Roll embossment | Roll embossment |
| | | First Surface | Ra (μm) | 2.8 | 1.0 | 1.1 | 1.3 | 1.5 | 2.5 | 1.6 | 3.5 | 3.5 |
| | | | Sm (μm) | 460 | 660 | 650 | 580 | 650 | 350 | 650 | 520 | 520 |
| | | | Ra × Sm | 1288 | 660 | 715 | 754 | 975 | 875 | 1040 | 1820 | 1820 |
| | | Second Surface | Ra (μm) | 2.9 | 1.1 | 0.9 | 1.5 | 1.4 | 2.4 | 1.5 | 3.6 | 3.6 |
| | | | Sm (μm) | 500 | 640 | 600 | 600 | 600 | 360 | 640 | 550 | 550 |
| | | | Ra × Sm | 1450 | 704 | 540 | 900 | 840 | 864 | 960 | 1980 | 1820 |

TABLE 1-continued

| | | | Example 1 | Example 2 | Example 3 | Example 4 | Example 5 | Example 6 | Example 7 | Example 8 | Example 9 |
|---|---|---|---|---|---|---|---|---|---|---|---|
| | Second Step | Impartment of protrusions and recesses | Roll embossment | Roll embossment | Roll embossment | Roll embossment | Roll embossment | Roll embossment | Roll embossment | Roll embossment | Roll embossment |
| | | Linear velocity (m/min) | 10 | 10 | 10 | 10 | 10 | 10 | 10 | 5 | 8 |
| Interlay film for laminated glass | First surface | Recess shape | Engraved lines | Engraved lines | Engraved lines | Engraved lines | Engraved lines | Engraved lines | Engraved lines | Engraved lines | Engraved lines |
| | | Rz (μm) | 45 | 42 | 30 | 31 | 45 | 40 | 39 | 43 | 43 |
| | | Sm (μm) | 300 | 295 | 301 | 200 | 196 | 199 | 200 | 195 | 202 |
| | | Str (before heating) | 0.037 | 0.032 | 0.035 | 0.020 | 0.030 | 0.028 | 0.021 | 0.026 | 0.029 |
| | | Str (after heating) | 0.071 | 0.040 | 0.040 | 0.030 | 0.033 | 0.039 | 0.027 | 0.030 | 0.045 |
| | | Δ Str | 0.034 | 0.008 | 0.005 | 0.010 | 0.003 | 0.011 | 0.006 | 0.004 | 0.016 |
| | Second Surface | Recess shape | Engraved lines | Engraved lines | Engraved lines | Engraved lines | Engraved lines | Engraved lines | Engraved lines | Engraved lines | Engraved lines |
| | | Rz (μm) | 45 | 43 | 28 | 30 | 45 | 37 | 38 | 42 | 43 |
| | | Sm (μm) | 300 | 295 | 300 | 200 | 199 | 199 | 200 | 200 | 197 |
| | | Str (before heating) | 0.034 | 0.030 | 0.037 | 0.022 | 0.030 | 0.030 | 0.022 | 0.028 | 0.030 |
| | | Str (after heating) | 0.071 | 0.039 | 0.042 | 0.032 | 0.033 | 0.039 | 0.028 | 0.031 | 0.045 |
| | | Δ Str | 0.037 | 0.009 | 0.005 | 0.010 | 0.003 | 0.009 | 0.006 | 0.003 | 0.015 |
| Evaluation of deaeration properties | | Tp (23° C. to 90° C.) (%) | 65 | 71 | 66 | 75 | 72 | 74 | 75 | 70 | 68 |
| | | Tp (50 to 90° C.) (%) | 60 | 65 | 60 | 64 | 62 | 63 | 73 | 63 | 59 |

TABLE 2

| | | | Example 10 | Example 11 | Example 12 | Example 13 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Production | First Step | Impartment of protrusions and recesses | Roll embossment | Roll embossment | Roll embossment | Roll embossment | Roll embossment | Roll embossment | Roll embossment | Melt fracture | Roll embossment | Roll embossment |
| | | First Surface Ra (μm) | 3.5 | 0.9 | 1.8 | 1.5 | 6.0 | 7.0 | 6.0 | 8.0 | 6.0 | 3.0 |
| | | Sm (μm) | 520 | 590 | 600 | 150 | 520 | 620 | 450 | 430 | 450 | 480 |
| | | Ra × Sm | 1820 | 531 | 1080 | 225 | 3120 | 4340 | 2700 | 3440 | 2700 | 1440 |
| | | Second Surface Ra (μm) | 3.7 | 0.9 | 1.9 | 1.6 | 6.2 | 6.7 | 5.8 | 8.5 | 5.5 | 3.3 |
| | | Sm (μm) | 450 | 550 | 550 | 150 | 510 | 650 | 470 | 470 | 450 | 460 |
| | | Ra × Sm | 1665 | 495 | 1045 | 240 | 3162 | 4355 | 2726 | 3995 | 2475 | 1518 |
| | Second Step | Impartment of protrusions and recesses | Roll embossment | Roll embossment | Roll embossment | Roll embossment | Roll embossment | Roll embossment | Roll embossment | Roll embossment | Roll embossment | Roll embossment |
| | | Linear velocity (m/min) | 10 | 10 | 10 | 10 | 10 | 10 | 10 | 10 | 5 | 8 |
| Interlay film for laminated glass | First surface | Recess shape | Engraved lines | Engraved lines | Engraved lines | Engraved lines | Engraved lines | Engraved lines | Engraved lines | Engraved lines | Engraved lines | Engraved lines |
| | | Rz (μm) | 42 | 35 | 30 | 38 | 46 | 42 | 30 | 40 | 30 | 38 |
| | | Sm (μm) | 195 | 194 | 450 | 190 | 307 | 400 | 200 | 200 | 200 | 195 |
| | | Str (before heating) | 0.029 | 0.015 | 0.035 | 0.022 | 0.060 | 0.070 | 0.045 | 0.050 | 0.045 | 0.042 |
| | | Str (after heating) | 0.060 | 0.020 | 0.043 | 0.022 | 0.105 | 0.250 | 0.092 | 0.300 | 0.220 | 0.150 |
| | | Δ Str | 0.031 | 0.005 | 0.008 | 0.000 | 0.045 | 0.180 | 0.047 | 0.250 | 0.175 | 0.031 |
| | Second Surface | Recess shape | Engraved lines | Engraved lines | Engraved lines | Engraved lines | Engraved lines | Engraved lines | Engraved lines | Engraved lines | Engraved lines | Engraved lines |
| | | Rz (μm) | 38 | 38 | 33 | 36 | 45 | 40 | 30 | 40 | 35 | 35 |
| | | Sm (μm) | 203 | 192 | 450 | 190 | 300 | 410 | 190 | 200 | 200 | 203 |
| | | Str (before heating) | 0.035 | 0.015 | 0.035 | 0.023 | 0.060 | 0.070 | 0.045 | 0.060 | 0.043 | 0.044 |
| | | Str (after heating) | 0.065 | 0.018 | 0.045 | 0.023 | 0.100 | 0.270 | 0.095 | 0.320 | 0.200 | 0.160 |
| | | Δ Str | 0.030 | 0.003 | 0.010 | 0.001 | 0.040 | 0.200 | 0.050 | 0.260 | 0.157 | 0.030 |
| Evaluation of deaeration properties | | Tp (23° C. to 90° C.) (%) | 66 | 77 | 65 | 75 | 64 | 62 | 64 | 63 | 66 | 65 |
| | | Tp (50 to 90° C.) (%) | 57 | 75 | 57 | 73 | 49 | 38 | 52 | 40 | 43 | 48 |

TABLE 3

|  |  |  |  | Example 14 | Example 15 | Example 16 | Example 17 | Comparative Example 7 |
|---|---|---|---|---|---|---|---|---|
| Production | First Step | Impartment of protrusions and recesses | | Roll embossment | Roll embossment | Melt fracture | Melt fracture | Roll embossment |
| | | First Surface | Ra (μm) | 1.3 | 1.5 | 2.5 | 2.5 | 6.0 |
| | | | Sm (μm) | 580 | 150 | 350 | 350 | 450 |
| | | | Ra × Sm | 754 | 225 | 875 | 875 | 2700 |
| | | Second Surface | Ra (μm) | 1.5 | 1.6 | 2.4 | 2.4 | 5.8 |
| | | | Sm (μm) | 600 | 150 | 360 | 360 | 470 |
| | | | Ra × Sm | 900 | 240 | 864 | 864 | 2726 |
| | Second Step | Impartment of protrusions and recesses | | Roll embossment | Roll embossment | Roll embossment | Roll embossment | Roll embossment |
| | | Linear velocity (m/min) | | 10 | 10 | 10 | 10 | 10 |
| Interlayer film for laminated glass | Thickest portion | First surface | Recess shape | Engraved lines | Engraved lines | Engraved lines | Engraved lines | Engraved lines |
| | | | Rz (μm) | 31 | 36 | 40 | 40 | 30 |
| | | | Sm (μm) | 200 | 190 | 199 | 199 | 200 |
| | | | Str (before heating) | 0.020 | 0.022 | 0.028 | 0.028 | 0.050 |
| | | | Str (after heating) | 0.030 | 0.022 | 0.039 | 0.039 | 0.091 |
| | | | Δ Str | 0.010 | 0.000 | 0.011 | 0.011 | 0.042 |
| | | Second Surface | Recess shape | Engraved lines | Engraved lines | Engraved lines | Engraved lines | Engraved lines |
| | | | Rz (μm) | 30 | 36 | 37 | 37 | 30 |
| | | | Sm (μm) | 200 | 190 | 199 | 199 | 190 |
| | | | Str (before heating) | 0.022 | 0.022 | 0.030 | 0.030 | 0.050 |
| | | | Str (after heating) | 0.032 | 0.023 | 0.039 | 0.039 | 0.095 |
| | | | Str (after heating) | 0.010 | 0.001 | 0.009 | 0.009 | 0.045 |
| | Thinnest portion | First surface | Recess shape | Engraved lines | Engraved lines | Engraved lines | Engraved lines | Engraved lines |
| | | | Rz (μm) | 31 | 38 | 40 | 48 | 30 |
| | | | Sm (μm) | 200 | 190 | 199 | 200 | 200 |
| | | | Str (before heating) | 0.020 | 0.022 | 0.028 | 0.025 | 0.050 |
| | | | Str (after heating) | 0.030 | 0.022 | 0.039 | 0.030 | 0.092 |
| | | | Δ Str | 0.010 | 0.000 | 0.011 | 0.005 | 0.042 |
| | | Second Surface | Recess shape | Engraved lines | Engraved lines | Engraved lines | Engraved lines | Engraved lines |
| | | | Rz (μm) | 30 | 36 | 37 | 37 | 30 |
| | | | Sm (μm) | 200 | 190 | 199 | 199 | 190 |
| | | | Str (before heating) | 0.022 | 0.022 | 0.030 | 0.030 | 0.050 |
| | | | Str (after heating) | 0.032 | 0.023 | 0.039 | 0.039 | 0.095 |
| | | | Δ Str | 0.010 | 0.001 | 0.009 | 0.009 | 0.045 |
| | Thickness | Minimum thickness | [um] | 800 | 830 | 780 | 900 | 800 |
| | | Maxium thickness | [um] | 1200 | 1600 | 1250 | 1230 | 1200 |
| | | Cross-sectional shape | [-] | Wedge shape | Wedge shape | Wedge shape | Wedge shape | Wedge shape |
| | | Width | mm | 1000 | 1000 | 1000 | 1000 | 1000 |
| | | Wedge angle | [mrad] | 0.40 | 0.77 | 0.47 | 0.33 | 0.40 |
| Evaluation of deaeration properties | Thickest portion | Tp (23° C. to 90° C.) (%) | | 72 | 75 | 69 | 73 | 60 |
| | | Tp (50 to 90° C.) (%) | | 60 | 71 | 58 | 68 | 49 |
| | Thinnest portion | Tp (23° C. to 90° C.) (%) | | 77 | 78 | 74 | 74 | 64 |
| | | Tp (50 to 90° C.) (%) | | 65 | 74 | 62 | 62 | 52 |

TABLE 4

| | | | Example 18 | Example 19 | Example 20 | Example 21 | Example 22 | Example 23 | Comparative Example 8 |
|---|---|---|---|---|---|---|---|---|---|
| First resin layer | Polyvinyl butyral resin | Butyral group content [mol %] | 69 | 68.5 | 69.9 | 69 | 69 | 69 | 69 |
| | | Hydroxy group content [mol %] | 30 | 31 | 29 | 30 | 30 | 30 | 30 |
| | | Acetyl group content [mol %] | 1 | 0.5 | 1.1 | 1 | 1 | 1 | 1 |
| | Plasticizer | Amount [phr] | 100 | 100 | 100 | 100 | 100 | 100 | 100 |
| | | Type [-] | 3GO | 3GO | 3GO | 3GO | 3GO | 3GO | 3GO |
| | | Amount [phr] | 36.0 | 36.0 | 39.0 | 36.0 | 36.0 | 36.0 | 36.0 |
| | Structure | Average Thickness [μm] | 350 | 350 | 345 | 350 | 350 | 350 | 350 |
| | | Cross-sectional shape [-] | Rectangular shape | Rectangular shape | Rectangular shape | Rectangular shape | Rectangular shape | Rectangular shape | Rectangular shape |
| Second resin layer | Polyvinyl butyral resin | Butyral group content [mol %] | 64 | 67 | 77.8 | 69 | 69 | 64 | 64 |
| | | Hydroxy group content [mol %] | 23.5 | 25.0 | 20.7 | 18.0 | 18.0 | 23.5 | 23.5 |
| | | Acetyl group content [mol %] | 12.5 | 8 | 1.5 | 13 | 13 | 12.5 | 12.5 |
| | Plasticizer | Amount [phr] | 100 | 100 | 100 | 100 | 100 | 100 | 100 |
| | | Type [-] | 3GO | 3GO | 3GO | 3GO | 3GO | 3GO | 3GO |
| | | Amount [phr] | 76.5 | 75.0 | 79.2 | 78.0 | 78.0 | 76.5 | 76.5 |
| | Structure | Average Thickness [μm] | 100 | 110 | 120 | 100 | 100 | 100 | 100 |
| | | Cross-sectional shape [-] | Rectangular Roll embossment | Rectangular Roll embossment | Rectangular Roll embossment | Rectangular Roll embossment | Rectangular Roll embossment | Rectangular Melt fracture | Rectangular Roll embossment |
| Production | First step | Impartment of protrusions and recesses | Roll embossment | Roll embossment | Roll embossment | Roll embossment | Roll embossment | Melt fracture | Roll embossment |
| | | First surface Ra (μm) | 1.4 | 1.4 | 1.4 | 1.8 | 1.8 | 2.7 | 7.2 |
| | | Sm (μm) | 570 | 580 | 600 | 610 | 610 | 340 | 620 |
| | | Ra × Sm | 798 | 812 | 840 | 1098 | 1098 | 918 | 4464 |
| | | Second surface Ra (μm) | 1.6 | 1.6 | 1.6 | 2.0 | 2.0 | 2.5 | 6.9 |
| | | Sm (μm) | 550 | 550 | 540 | 550 | 550 | 360 | 650 |
| | | Ra × Sm | 880 | 880 | 864 | 1100 | 1100 | 900 | 4485 |
| | Second Step | Impartment of protrusions and recesses | Roll embossment | Roll embossment | Roll embossment | Roll embossment | Roll embossment | Roll embossment | Roll embossment |
| | | Linear velocity (m/min) | 10 | 10 | 10 | 10 | 10 | 10 | 10 |
| Interlayer film for laminated glass | First surface | Recess shape | Engraved lines | Engraved lines | Engraved lines | Engraved lines | Engraved lines | Engraved lines | Engraved lines |
| | | Rz (μm) | 31 | 31 | 31 | 30 | 37 | 39 | 43 |
| | | Sm (μm) | 200 | 200 | 199 | 450 | 192 | 199 | 402 |
| | | Str (before heating) | 0.021 | 0.021 | 0.020 | 0.036 | 0.022 | 0.028 | 0.072 |
| | | Str (after heating) | 0.031 | 0.030 | 0.030 | 0.043 | 0.022 | 0.040 | 0.255 |
| | | Δ Str | 0.010 | 0.009 | 0.010 | 0.007 | 0.000 | .012 | 0.183 |
| | Second Surface | Recess shape | Engraved lines | Engraved lines | Engraved lines | Engraved lines | Engraved lines | Engraved lines | Engraved lines |
| | | Rz (μm) | 30 | 30 | 30 | 33 | 38 | 39 | 41 |
| | | Sm (μm) | 202 | 200 | 195 | 450 | 190 | 202 | 405 |
| | | Str (before heating) | 0.022 | 0.021 | 0.022 | 0.036 | 0.021 | 0.030 | 0.075 |
| | | Str (after heating) | 0.032 | 0.031 | 0.032 | 0.046 | 0.022 | 0.039 | 0.278 |
| | | Δ Str | 0.010 | 0.010 | 0.010 | 0.010 | 0.001 | 0.009 | 0.203 |
| | Structure [-] | | First resin layer/second resin layer/first resin layer | First resin layer/second resin layer/first resin layer | First resin layer/second resin layer/first resin layer | First resin layer/second resin layer/first resin layer | First resin layer/second resin layer/first resin layer | First resin layer/second resin layer/first resin layer | First resin layer/second resin layer/first resin layer |
| | Cross-sectional shape [-] | | Rectangular | Rectangular | Rectangular | Rectangular | Rectangular | Rectangular | Rectangular |

TABLE 4-continued

| | | Example 18 | Example 19 | Example 20 | Example 21 | Example 22 | Example 23 | Comparative Example 8 |
|---|---|---|---|---|---|---|---|---|
| Evaluation of deaeration properties | Tp (23° C. to 90° C.) (%)<br>Tp (50 to 90° C.) (%) | shape<br>77<br>65 | shape<br>76<br>66 | shape<br>71<br>51 | shape<br>65<br>57 | shape<br>78<br>74 | shape<br>74<br>62 | shape<br>62<br>38 |

TABLE 5

| | | | | Example 24 | Comparative Example 9 |
|---|---|---|---|---|---|
| First resin layer | Polyvinyl butyral resin | Butyral group content | [mol %] | 69 | 69.9 |
| | | Hydroxy group content | [mol %] | 30 | 29 |
| | | Acetyl group content | [mol %] | 1 | 1.1 |
| | | Amount | [phr] | 100.0 | 100.0 |
| | Plasticizer | Type | [—] | 3GO | 3GO |
| | | Amount | [phr] | 36.0 | 39.0 |
| | Structure | Minimum thickness | [μm] | 350 | 345 |
| | | Maximum thickness | [μm] | 610 | 605 |
| | | Cross-sectional shape | [—] | Wedge | Wedge |
| Second resin layer | Polyvinyl butyral resin | Butyral group content | [mol %] | 64 | 77.8 |
| | | Hydroxy group content | [mol %] | 23.5 | 20.7 |
| | | Acetyl group content | [mol %] | 12.5 | 1.5 |
| | | Amount | [phr] | 100 | 100 |
| | Plasticizer | Type | [—] | 3GO | 3GO |
| | | Amount | [phr] | 76.5 | 79.2 |
| | Structure | Minimum thickness | [μm] | 100 | 110 |
| | | Maximum thickness | [μm] | 180 | 190 |
| | | Cross-sectional shape | [—] | Wedge | Wedge |
| Production | First step | Impartment of protrusions and recesses | | Roll embossment | Roll embossment |
| | | First surface | Ra (μm) | 1.3 | 6.0 |
| | | | Sm (μm) | 580.0 | 450 |
| | | | Ra × Sm | 755 | 2700 |
| | | Second surface | Ra (μm) | 2 | 5.8 |
| | | | Sm (μm) | 600.0 | 470 |
| | | | Ra × Sm | 900 | 2726 |
| | Second step | Impartment of protrusions and recesses | | Roll embossment | Roll embossment |
| | | Linear velocity (m/min) | | 10 | 10 |
| Interlayer film for laminated glass | Thickest portion | First surface | Recess shape | Engraved lines | Engraved lines |
| | | | Rz (μm) | 31 | 30 |
| | | | Sm (μm) | 200 | 200 |
| | | | Str (before heating) | 0.020 | 0.050 |
| | | | Str (after heating) | 0.030 | 0.092 |
| | | | ΔStr | 0.010 | 0.042 |
| | | Second surface | Recess shape | Engraved lines | Engraved lines |
| | | | Rz (μm) | 30 | 30 |
| | | | Sm (μm) | 200 | 190 |
| | | | Str (before heating) | 0.022 | 0.050 |
| | | | Str (after heating) | 0.032 | 0.095 |
| | | | ΔStr | 0.010 | 0.045 |
| | Thinnest portion | First surface | Recess shape | Engraved lines | Engraved lines |
| | | | Rz (μm) | 31 | 30 |
| | | | Sm (μm) | 200 | 200 |
| | | | Str (before heating) | 0.020 | 0.050 |
| | | | Str (after heating) | 0.030 | 0.092 |
| | | | ΔStr | 0.010 | 0.042 |
| | | Second surface | Recess shape | Engraved lines | Engraved lines |
| | | | Rz (μm) | 30 | 30 |
| | | | Sm (μm) | 200 | 190 |
| | | | Str (before heating) | 0.022 | 0.050 |
| | | | Str (after heating) | 0.032 | 0.095 |
| | | | ΔStr | 0.010 | 0.045 |
| | Thickness | Minimum thickness | [—] | 800 | 800 |
| | | Maximum thickness | [—] | 1400 | 1400 |
| | | Cross-sectional shape | [—] | Wedge | Wedge |
| | | Width | mm | 1000 | 1000 |
| | | Structure | [—] | First resin layer/second resin layer/first resin layer | First resin layer/second resin layer/first resin layer |
| | | Wedge angle | [mrad] | 0.60 | 0.60 |
| Evaluation of deaeration properties | Thickest portion | Tp (23° C. to 90° C.) (%) | | 70 | 59 |
| | | Tp (50 to 90° C.) (%) | | 60 | 48 |
| | Thinnest portion | Tp (23° C. to 90° C.) (%) | | 75 | 64 |
| | | Tp (50 to 90° C.) (%) | | 64 | 52 |

INDUSTRIAL APPLICABILITY

The present invention can provide an interlayer film for a laminated glass that enables production of a laminated glass having high visible light transmittance even when deaeration for preliminary pressure bonding and heating for final pressure bonding are performed in parallel in a vacuum deaeration method. The present invention also can provide a method for producing the interlayer film for a laminated glass and a laminated glass including the interlayer film for a laminated glass.

REFERENCE SIGNS LIST 1 recess
2 recess 3 recess
4 laminate after preliminary pressure bonding in production of laminated glass
A interval between recess 1 and recess 2
B interval between recess 1 and recess 3

The invention claimed is:

1. An interlayer film for a laminated glass having a multitude of recesses on at least one surface,
    the surface with the recesses having a texture aspect ratio Str of 0.04 or lower as measured in conformity with ISO 25178,
    wherein the interlayer film has a wedge-shaped cross section,
    the recesses have a groove shape with a continuous bottom, and
    the surface with the recesses has a ten-point average roughness Rz of 10 μm or more and 50 μm or less as measured in conformity with JIS B 0601(1994).

2. The interlayer film for a laminated glass according to claim 1,
    wherein after heating at 100° C. for 15 minutes, the surface with the recesses has a texture aspect ratio Str of 0.08 or less as measured in conformity with ISO 25178.

3. A laminated glass comprising:
    a pair of glass plates; and
    the interlayer film for a laminated glass according to claim 1 interposed between the pair of glass plates.

4. The interlayer film for a laminated glass according to claim 1,
    wherein a wedge angle θ of the interlayer film having the wedge-shaped cross section is 0.1 mrad or more and 1 mrad or less.

5. A method for producing the interlayer film for a laminated glass according to claim 1, comprising:
    a first step of imparting fine protrusions and recesses to a surface of a resin film; and
    a second step of imparting recesses in the shape of engraved lines to the surface of the resin film,
    the resin film after the first step having an arithmetic average roughness Ra of 4 μm or less as measured in conformity with JIS B 0601(1994),
    in the second step, the recesses in the shape of engraved lines being imparted at a linear velocity of 10 m/min or less.

6. The method for producing the interlayer film for a laminated glass according to claim 5,
    wherein a product (Ra×Sm) of the arithmetic average roughness Ra of the resin film after the first step as measured in conformity with JIS B 0601(1994) and an interval Sm of the recesses is 2,500 or less.

* * * * *